(12) United States Patent
Hartwich et al.

(10) Patent No.: US 9,154,324 B2
(45) Date of Patent: Oct. 6, 2015

(54) METHOD AND FILTER SYSTEM FOR FILTERING MESSAGES RECEIVED VIA A SERIAL DATA BUS OF A COMMUNICATION NETWORK BY A USER OF THE NETWORK

(75) Inventors: Florian Hartwich, Reutlingen (DE); Franz Bailer, Moessingen (DE); Markus Ihle, Kusterdingen (DE); Christian Horst, Dusslingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 663 days.

(21) Appl. No.: 12/922,010

(22) PCT Filed: Mar. 5, 2009

(86) PCT No.: PCT/EP2009/052571
§ 371 (c)(1),
(2), (4) Date: Dec. 29, 2010

(87) PCT Pub. No.: WO2009/112411
PCT Pub. Date: Sep. 17, 2009

(65) Prior Publication Data
US 2011/0125855 A1 May 26, 2011

(30) Foreign Application Priority Data
Mar. 10, 2008 (DE) .......................... 10 2008 000 583

(51) Int. Cl.
G06F 15/16 (2006.01)
H04L 12/40 (2006.01)
H04L 29/06 (2006.01)
H04L 12/46 (2006.01)

(52) U.S. Cl.
CPC ...... *H04L 12/40032* (2013.01); *H04L 63/0227* (2013.01); *H04L 12/4625* (2013.01); *H04L 2012/40215* (2013.01)

(58) Field of Classification Search
None
See application file for complete search history.

(56) References Cited

U.S. PATENT DOCUMENTS

| 2002/0073243 A1* | 6/2002 | Staiger .......................... 709/313 |
| 2002/0161820 A1* | 10/2002 | Pellegrino et al. ............ 709/201 |
| 2002/0188567 A1 | 12/2002 | Candelore |

(Continued)

FOREIGN PATENT DOCUMENTS

| CN | 1407762 | 4/2003 |
| CN | 101120568 | 2/2008 |

(Continued)

*Primary Examiner* — Thomas Dailey
(74) *Attorney, Agent, or Firm* — Kenyon & Kenyon LLP

(57) ABSTRACT

A method and a filter system for filtering messages which are received, via a serial data bus of a communications network, in a communication module of a user connected to the data bus. To allow particularly simple and efficient filtering of incoming messages, even when there is a large number of filtering criteria, it is proposed that the filter system includes a list in which multiple identifier pairs are stored which define a range delimited in each case by a first identifier and a second identifier. The identifier for an incoming message is compared at least to selected identifier pairs from the list, and a query is made concerning whether the identifier for the incoming message is greater than, or greater than or equal to, the selected first identifier, and is less than, or less than or equal to, the selected second identifier. The incoming message is forwarded to the application or rejected, depending on the configuration bit specification, if the identifier for the incoming message is within the range delimited by the first identifier and the second identifier.

13 Claims, 3 Drawing Sheets

(56) References Cited

U.S. PATENT DOCUMENTS

| | | | |
|---|---|---|---|
| 2003/0051061 A1* | 3/2003 | Hank et al. | 709/250 |
| 2003/0056016 A1* | 3/2003 | Bartling | 709/250 |
| 2003/0135622 A1* | 7/2003 | Anderson et al. | 709/227 |
| 2004/0153583 A1* | 8/2004 | Bartling | 710/29 |
| 2005/0125840 A1 | 6/2005 | Anderson et al. | |
| 2006/0168010 A1 | 7/2006 | Vill et al. | |
| 2007/0157156 A1* | 7/2007 | Meier et al. | 717/101 |
| 2007/0266241 A1 | 11/2007 | Wu et al. | |

FOREIGN PATENT DOCUMENTS

| | | |
|---|---|---|
| DE | 101 43 356 | 3/2003 |
| EP | 1659752 | 5/2006 |
| JP | 10-290268 | 10/1998 |
| JP | 2003-110608 | 4/2003 |
| JP | 2005-328119 | 11/2005 |
| JP | 2005-337017 | 12/2005 |
| KR | 20000059519 | 10/2000 |
| RU | 2371872 | 10/2009 |

* cited by examiner

METHOD AND FILTER SYSTEM FOR FILTERING MESSAGES RECEIVED VIA A SERIAL DATA BUS OF A COMMUNICATION NETWORK BY A USER OF THE NETWORK

FIELD OF THE INVENTION

The present invention relates to a method for filtering, with the aid of a filter system, messages which are received, via a serial data bus of a communication network, in a communication module of a user connected to the data bus. The messages each have an identifier for identification. The characteristics of the filter system are defined by message identifiers which are stored in at least one list of the filter system. Moreover, the present invention relates to a filter system for a communication module of a user connected to a serial data bus of a communication network for carrying out the above-mentioned method.

BACKGROUND INFORMATION

There are believed to be communication networks from the related art in which messages are transmitted according to serial communication protocols (for example, Controller Area Network (CAN), FlexRay, Local Interconnect Network (LIN), and Media Oriented Systems Transport (MOST)). The networks include at least one data bus to which multiple user nodes are connected. It is also known for all user nodes connected to the data bus in these communication networks not to use all of the messages sent via the data bus. Each user node includes a communication module and an application. To relieve load on the host application in the user nodes, many of the communication modules forward to the application only the messages which are also used in the application. The messages are recognized on the basis of their numerical identifiers. This method is referred to as "acceptance filtering." The known methods for acceptance filtering include lists of identifiers which are to be allowed through (so-called acceptance codes). Portions of the identifiers may be masked for the filtering, so that each list entry may stand for a group of identifiers (so-called acceptance mask). In each case n bits of the identifier may be masked with the aid of a mask, so that the identifier stands for a group of 2n identifiers. The known method may be varied using lists of identifiers which are not to be accepted, i.e., which are to be blocked. These lists are configurable using software.

When an application uses messages from a broad spectrum of identifiers, the filtering capabilities of the hardware communication module may not be adequate for passing through all necessary messages and at the same time blocking all unnecessary messages. For the remaining acceptance filtering, the application software must then expend computing power of the computing unit (central processing unit (CPU), for example) of the user node. In addition, other variables of the groups defined by the acceptance masks are possible only by overlaying, by simultaneously observing and combining multiple list entries. However, this requires time and hardware resources. A further disadvantage of the filtering using acceptance codes and acceptance masks is the risk that desired messages are inadvertently rejected. To prevent this, the acceptance mask is usually opened very wide, so that as a result messages which actually are not used at all by the application are also accepted. This results in an additional load on the application software (frequent operation of the FIFO for retrieving the message, filtering the message, etc.).

Based on the described related art, an object of the exemplary embodiments and/or exemplary methods of the present invention is to implement, with the least possible complexity, acceptance filtering having a large number of filtering criteria.

SUMMARY OF THE INVENTION

To achieve this object, based on the filtering method of the type referenced at the outset, multiple identifier pairs may be stored in the at least one list of the filter system which define a range delimited in each case by a first identifier and a second identifier, the identifier of an incoming message is compared at least to selected identifier pairs, and a query is made concerning whether the identifier for the incoming message is greater than, or greater than or equal to, the selected first identifier, and is less than, or less than or equal to, the selected second identifier, and the incoming message is forwarded to the application or is rejected if the identifier for the incoming message is within the range delimited by the first identifier and the second identifier.

Thus, the filtering method according to the present invention does not use a list containing individual identifiers having optional acceptance masks, but, rather, uses a list of identifier pairs. The proposed method defines an identifier pair as a band pass filter (so-called acceptance filter) or as a band stop filter (so-called rejection filter). All the identifiers for received messages whose numerical values are between the two numerical values (of the first and second identifiers) of the identifier pair are accepted (band pass), or rejected or discarded (band stop). Multiple identifier pairs may be considered sequentially until a matching pair is found or until the end of the list is reached.

The advantage of the range filter according to the present invention is that the identifier pairs may be considered independently of one another, and the width of the filter ranges may be defined as desired. The filter system may be implemented in hardware. The identifier pairs may be considered sequentially, beginning with a given identifier pair, in particular beginning at the start of the list. This has the advantage that the control of the filtering method and the access to the list contents have a simple and resource-conserving design, and the identifier pairs may be stored in a random access memory (RAM, for example) or also in a read-only memory (ROM) and variations thereof (PROM, EPROM, EEPROM), and do not have to be implemented in (flip-flop) registers.

Advantageous embodiments of the exemplary embodiments and/or exemplary methods of the present invention are described herein, and are explained in greater detail below with reference to the figures.

BRIEF DESCRIPTION OF THE DRAWINGS

FIG. 3 shows one example of a filter element of a list of the filter system according to the present invention for 11-bit identifiers for CAN messages.

FIG. 4 shows one example of a filter element of a list of the filter system according to the present invention for 29-bit identifiers for CAN messages.

DETAILED DESCRIPTION

Figure 1:
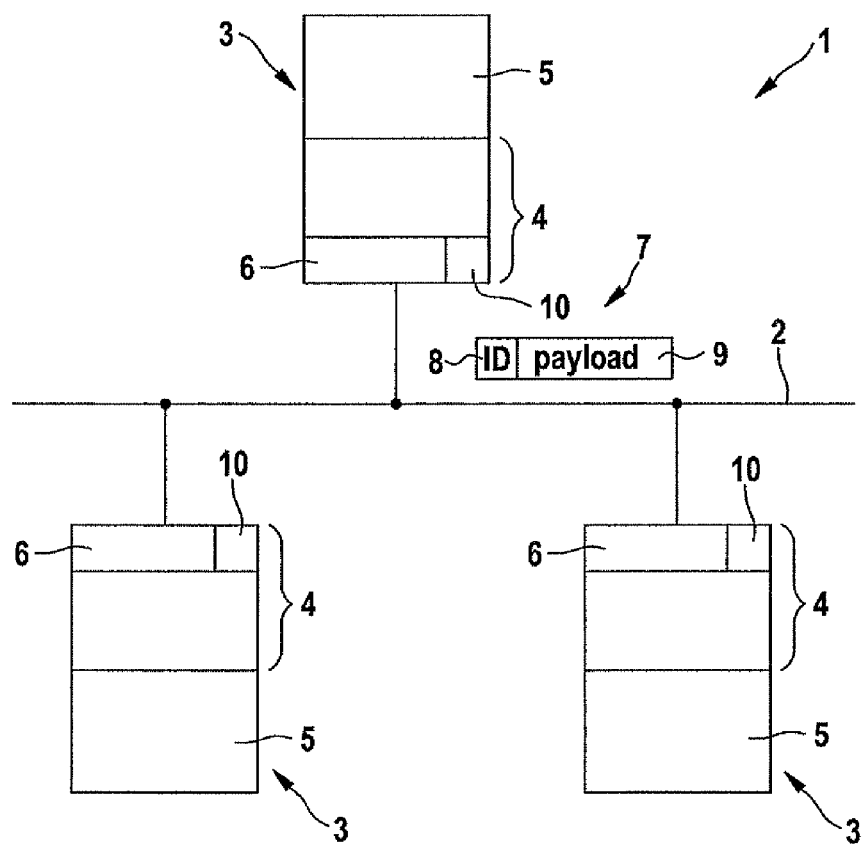
FIG. 1 shows one example of a communication network having user nodes which have a filter system according to the present invention.

A communication network is denoted overall by reference numeral 1 in FIG. 1. Network 1 includes a data bus 2 which is represented by a single line. Multiple user nodes 3, of which three are illustrated only as an example in FIG. 1, are connected to data bus 2. Each node 3 is connected to data bus 2 via a communication module 4. Nodes 3 also have a host application 5.

Messages 7 may be transmitted via data bus 2 according to a serial communication protocol (for example, CAN, FlexRay, LIN, MOST, among others). Communication module 4 is responsible for receiving and sending messages 7 via data bus 2. Since not all messages 7 which are sent via bus 2 are used by all nodes 3 connected to bus 2, communication modules 4 have a filter system 6. Filter system 6 allows only messages 7 through to application 5 which are intended for the particular node 3 and which are also actually used in application 5 of node 3.

Messages 7 each have an identifier 8 which allows messages 7 to be uniquely identified. For CAN, identifier 8 is, for example, a type of sender address which allows the origin of message 7 to be ascertained and which identifies the content of message 7. In addition to identifier 8, messages 7 have a payload data portion 9. The filtering method carried out by filter system 6 is also referred to as "acceptance filtering."

The exemplary embodiments and/or exemplary methods of the present invention relates to a refinement of filter system 6, thus allowing a particularly large number of filtering criteria to be implemented with relatively little complexity. The acceptance filtering begins operation when a new message 7 has been received. Identifier 8 for received message 7 (a numerical value) is compared to a list of configured identifier pairs in order to decide whether received message 7 is to be forwarded to application software 5 or whether message 7 is to be discarded.

The implementation may be carried out in hardware. An important aspect of the exemplary embodiments and/or exemplary methods of the present invention concerns at least one list which is stored in a memory element 10 of filter system 6. Memory element 10 may be configured as a random access memory (RAM, for example) or as a read-only memory (flash memory, ROM, EEPROM, for example). The at least one list includes, for example, 128 entries, each having a 32-bit width. Of course, the list may also contain a larger or smaller number of entries (for example, 256 or 64), or entries having a larger or smaller width (for example, 64 or 16 bits). A word length of 64 bits would have the advantage that for extended 29-bit CAN identifiers, for example, an identifier pair together with configuration bits could be accommodated in one data word, thus allowing both identifiers of the identifier pair to be read in a single reading operation.

Multiple identifier pairs are stored in the list which define a range delimited in each case by a first identifier ID1 and a second identifier ID2. Identifier 8 for an incoming message 7 is successively compared to identifier pairs from the list, beginning with a given identifier pair from the list, which may be the first list entry, until a range defined by an identifier pair has been found in which identifier 8 for message 7 is present. In this case, incoming message 7 is then either forwarded to application 5 or is rejected, depending on the configuration. The identifier pairs from the list may be sequentially compared to identifier 8 for incoming message 7. If it is not possible to find in the list a range which is defined by an identifier, in which identifier 8 for message 7 is present, incoming message 7 may either be forwarded to application 5 or be rejected, depending on the configuration.

The advantage of the method is that the identifier pairs may be sequentially considered independently of one another, and the width of their filter ranges may be configured as desired. Since the identifier pairs are considered sequentially, they may be stored in a random access memory or in a read-only memory, and do not have to be implemented in flip-flop registers. This allows the exemplary embodiments and/or exemplary methods of the present invention to be implemented in a simple and cost-effective manner.

In the exemplary embodiments and/or exemplary methods of the present invention, the comparative identifiers are present as a list of identifier pairs which are stored in a memory element 10. Memory 10 is typically implemented as RAM, although for specialized applications nonvolatile memories (NVRAM, flash memory, FeRAM, MRAM, PCRAM) are possible. The number of identifier pairs may be freely set. For each identifier pair, a determination is made as to whether the identifier pair acts as a band pass filter (so-called acceptance filter) or as a band stop filter (so-called rejection filter). The two numerical values of an identifier pair may be identical, in which case the identifier pair acts on only one specific message. Acceptance filter 6, i.e., the contents of the at least one filter list, and the received messages may be stored in the same memory, it being possible to configure the storage space to create a partition between filters and messages.

The memory area needed for an identifier pair depends on the communication protocol. For 11-bit CAN identifiers an identifier pair may be accommodated in a 32-bit data word, for example. For 29-bit CAN identifiers an identifier pair may be accommodated in two 32-bit data words, for example, each having configuration bits which specify, for example, whether the pair acts as a band pass filter or as a band stop filter. To save storage space in some applications, identifier pairs whose two numerical values are identical may optionally be replaced by single identifiers in the list. In CAN applications, separate lists may be provided for data frames and for remote frames, as well as for 11-bit identifiers and for 29-bit identifiers. The proposed acceptance filtering method may also be combined with masks which mask portions of the identifiers for the filtering. It is also conceivable to combine the proposed range filter method with other known filtering methods. Conceivable would be, for example, a combination using a so-called classic filter, in which identifier 8 for incoming message 7 could be compared to at least one acceptance identifier (so-called acceptance code) and/or to at least one acceptance mask. A first identifier contained in the list may be used as an acceptance identifier, and a corresponding second identifier contained in the list may be used as an acceptance mask. A combination of the proposed range filtering method with a so-called dual ID filter would also be possible. In this case, both identifiers stored in the list are compared to identifier 8 for received message 7.

Figure 2:
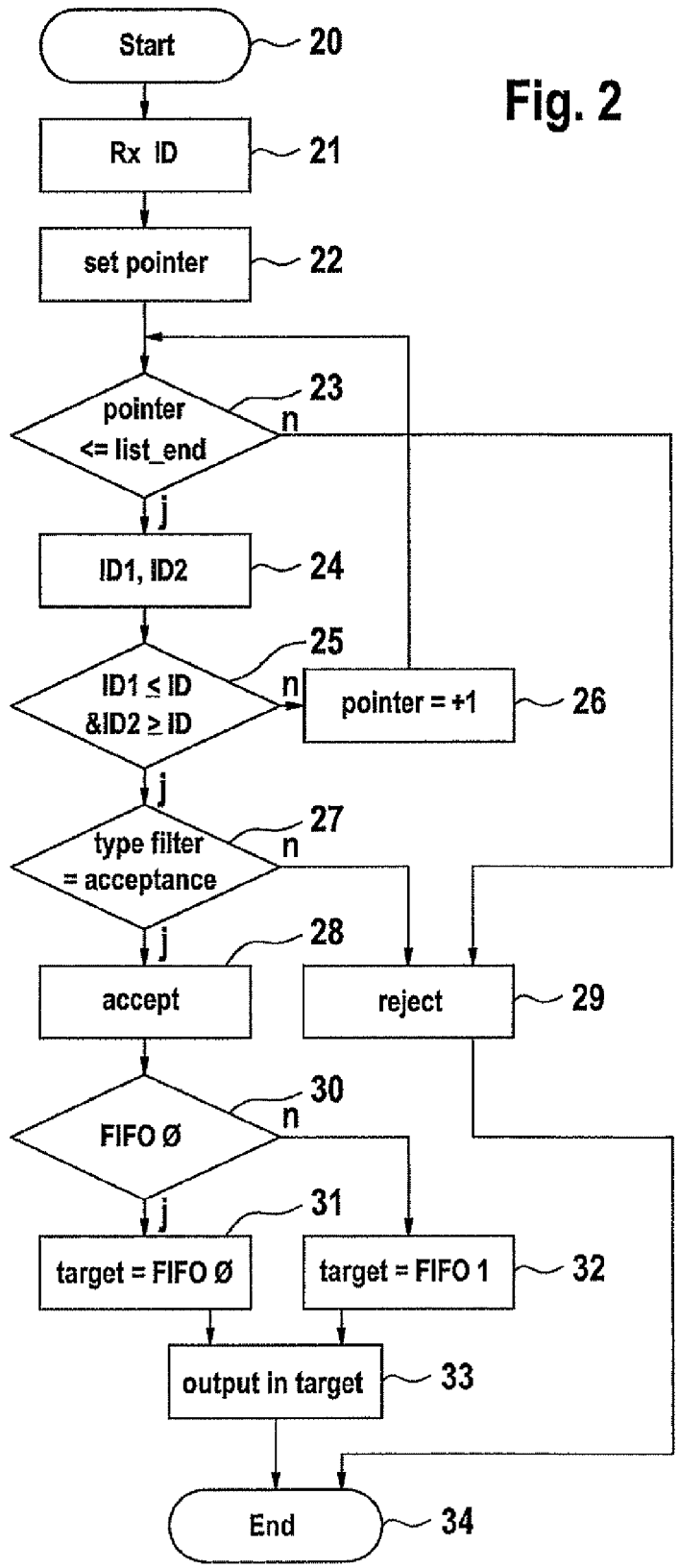
FIG. 2 shows one example of a flow chart of a filtering method according to the present invention.

The method according to the present invention is explained in greater detail below with reference to the flow chart from FIG. 2. The method starts in a function block 20. The acceptance filtering begins operation when a new message 7 has been received. Identifier (ID) 8 for an incoming message 7 is then read in a function block 21. In a function block 22 a pointer is set to a given location in the list, which may be to the first identifier pair at the start of the list. The filter processor receives as input parameters identifier 8 for received message 7, the pointer to the list of identifier pairs, and the number of list entries (size of the list). A check is made in a query block 23 as to whether the pointer is still present within the list.

If "yes," in a function block 24 the processor reads a first identifier pair from the list, and in a query block 25 checks whether the numerical value of received identifier 8 is within the range defined by the identifier pair. If "no," the pointer is incremented by a value of 1 in a function block 26, and the method branches to query block 23. In the subsequent pass the next identifier pair is read from the list and compared to identifier 8 of attached message 7. This loop is run through until the end of the list is reached ("no" at query block 23), or until a match is present, i.e., until the numerical value of received identifier 8 is within the range defined by the identifier pair ("yes" at query block 25).

If a match is present, the method branches to a query block 27, where it is ascertained whether the current identifier pair is to act as a band pass filter (acceptance). If "yes," a determination is made in a function block 28 that incoming message 7 is to be accepted. If "no," a determination is made in a function block 29 that incoming message 7 is to be rejected. Information concerning whether the identifier pair is to act as a band pass filter or as a band stop filter may also be stored in the list in the form of a standard filter mode (SFM) configuration bit.

In addition, if the end of the list is reached without a match being present, i.e., no matching identifier pairs have been found in the list, in the illustrated exemplary embodiment the method branches to function block 29. The actions taken in this case may be configured in advance. The system could also be configured so that if no matching identifier pairs have been found in the list, attached message 7 is accepted. In this case, the method would then have to branch from the "no" branch of query block 23 to function block 28.

From function block 28 the method branches to a further query block 30, where a check is made as to whether incoming message 7 is to be stored in a first buffer memory FIFO0, from which location application 5 is then able to retrieve message 7. It is possible, for example, to store message 7 in a different buffer memory, depending on whether message 7 is important or unimportant, time-critical or less time-critical, or, in the case of a gateway, whether the message is intended for channel A or for channel B. Information concerning which buffer memory message 7 is to be stored in may likewise be stored in the list in the form of a standard filter FIFO select (SFFS) configuration bit. It is then specified in a function block 31 that message 7 is to be stored in first buffer memory FIFO0. If message 7 is not to be stored in buffer memory FIFO0, the method branches to a function block 32, where a determination is made that message 7 is to be stored in second buffer memory FIFO1, from which location application 5 is then able to retrieve message 7. However, the exemplary embodiments and/or exemplary methods of the present invention are not limited to only two buffer memories FIFO0 and FIFO1. When the exemplary embodiments and/or exemplary methods of the present invention is used in a gateway having multiple channels, it may be meaningful, for example, to have more than two buffer memories FIFO0, FIFO1. A greater number of FIFOs having a depth of 1 would then be a so-called full CAN.

In a function block 33 incoming message 7 is then stored in selected buffer memory FIFO0 or FIFO1. The method is then terminated in a function block 34. The method is also terminated when the queued message is to be rejected (function block 29).

Figures 3, 4:
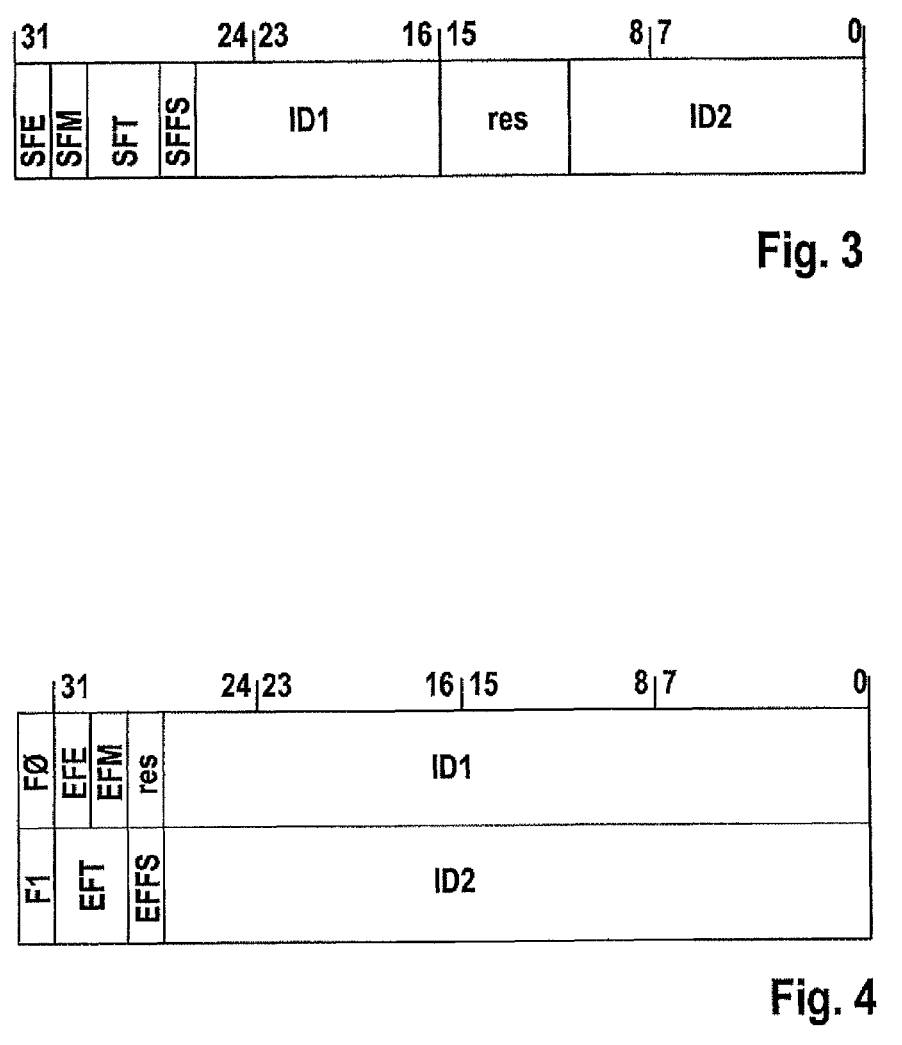

One example of a possible design of a 32-bit data word of memory element 10 for a standard 11-bit CAN identifier is shown in FIG. 3. Bit 31 includes a standard filter enable (SFE) configuration bit. All active filter elements are used for the acceptance filtering of standard data frames. The value "0" of bit 31 indicates that the filter is inactive, and the value "1" indicates that the filter is active. Bit 30 includes a standard filter mode (SFM) configuration bit. The value "0" of bit 30 indicates that the attached message 7 is accepted if the filtering results in a match, and the value "1" indicates that the attached message is discarded if the filtering results in a match.

Bits 29 and 28 include standard filter type (SFT) configuration bits. The value "00" of bits 29 and 28 indicates that the filter element includes a range filter in the range from first identifier ID1 to second identifier ID2. The value "01" indicates that the filter element includes a dual ID filter for first identifier ID1 and second identifier ID2. The value "10" indicates that the filter element includes a classic filter, first identifier ID1 representing an acceptance code and second identifier ID2 representing an acceptance mask. The value "11" is reserved, for example, for future expansions of the method.

Bit 27 includes a standard filter FIFO select (SFFS) configuration bit. The value "0" of bit 27 indicates that an accepted message 7 is stored in a first buffer memory FIFO0, and the value "1" indicates that an accepted message 7 is stored in a second buffer memory FIFO1. The eleven bits 26 through 16 include standard filter identifier ID1, and the eleven bits 10 through 0 include standard filter identifier ID2. Bits 11 through 15 are reserved.

One example of a possible design of two 32-bit data words of memory element 10 for an extended 29-bit CAN identifier is shown in FIG. 4. Bit 31 of first data word F0 includes an extended filter enable (EFE) configuration bit. All active filter elements are used for the acceptance filtering of extended data frames. The value "0" of bit 31 indicates that the filter is inactive, and the value "1" indicates that the filter is active. Bit 30 of the first data word includes an extended filter mode (EFM) configuration bit. The value "0" of bit 30 indicates that the attached message 7 is accepted if the filtering results in a match, and the value "1" indicates that the attached message is discarded if the filtering results in a match. Bit 29 of the first data word is reserved.

Bits 31 and 30 of second data word F1 include extended filter type (EFT) configuration bits. The value "00" of bits 31 and 30 indicates that the filter element includes a range filter in the range from first identifier ID1 to second identifier ID2. The value "01" indicates that the filter element includes a dual ID filter for first identifier ID1 and second identifier ID2. The value "10" indicates that the filter element includes a classic filter, first identifier ID1 representing an acceptance code and second identifier ID2 representing an acceptance mask. The value "11" is reserved, for example, for future expansions of the method. Bit 29 of the second data word includes an extended filter FIFO select (EFFS) configuration bit. The value "0" of bit 29 indicates that an accepted message 7 is stored in a first buffer memory FIFO0, and the value "1" indicates that an accepted message 7 is stored in a second buffer memory FIFO1.

The 29 bits 28 through 0 of the first data word include extended filter identifier ID1, and the 29 bits 28 through 0 of the second data word include extended filter identifier ID2.

The method according to the present invention is particularly suitable for use in a gateway. A so-called basic CAN controller having one or multiple FIFOs may be used. The gateway is connected to various data buses 2 of various networks 1. The gateway is used for transferring messages from a first data bus 2 of a first network 1 to a second data bus 2 of a second network 1. The load on the gateway software may be greatly relieved by the filtering of messages according to the present invention. A key advantage of the exemplary embodiments and/or exemplary methods of the present invention also results in particular with respect to a gateway. Unlike many normal user nodes 3, a gateway must be able to process, i.e., forward, a large number of messages 7 transmitted in a network 1. For this reason there is a particularly large number of filtering criteria for a gateway, which with the aid of the exemplary embodiments and/or exemplary methods of the present invention may be implemented with little complexity in hardware. In addition, the exemplary embodiments and/or exemplary methods of the present invention allows incoming messages to be filtered in a particularly rapid, efficient, and resource-conserving manner. The method according to the present invention may also be used for so-called full CAN controllers, in that additional configuration bits of the filter elements not only distinguish between two FIFOs, but also sort messages in memories which are reserved for these messages (so-called dedicated message buffers).

What is claimed is:

1. A method for filtering messages, which are received, via a serial data bus of a communication network, in a communication module of a user connected to the data bus, the method comprising:

using a filter system, the messages each having an identifier for identification, and the characteristics of the filter system being defined by message identifiers which are stored in at least one list of the filter system, wherein each identifier specifies a priority of a corresponding message;

storing multiple identifier pairs in the at least one list of the filter system which define a range delimited in each case by a first identifier and a second identifier;

comparing the identifier for an incoming message to at least selected identifier pairs;

making a query concerning whether the identifier for the incoming message is greater than or equal to the first identifier of a selected identifier pair and less than or equal to the second identifier of the selected identifier pair;

wherein:

each identifier pair has an associated filter type information stored in the at least one list, each item of filter type information identifying whether an incoming message that is within the range delimited by the first identifier and the second identifier of a respectively associated identifier pair should be forwarded to the application or rejected;

forwarding the incoming message to the application in response to determining that (a) the identifier for the incoming message is within the range delimited by the first identifier and the second identifier of the selected identifier pair, and (b) the filter type information of the selected identifier pair identifies forwarding; and rejecting the incoming message to the application in response to determining that (a) the identifier for the incoming message is within the range delimited by the first identifier and the second identifier of the selected identifier pair, and (b) the filter type information of the selected identifier pair identifies rejecting.

2. The method of claim 1, wherein the identifier for an incoming message is compared to identifier pairs from the list until the identifier for the incoming message is within the range delimited by the first identifier and the second identifier of the identifier pair in the current query, or until the end of the list is reached.

3. The method of claim 1, wherein the identifier for an incoming message, beginning with a given identifier pair from the list, is compared to an identifier pair in the list immediately following the identifier pair of the preceding query until the identifier for the incoming message is within the range delimited by the first identifier and the second identifier of the identifier pair in the current query, or until the end of the list is reached.

4. The method of claim 1, wherein in addition to each identifier pair, associated forwarding information is stored in the list of the filter system, and wherein an incoming message is forwarded to a given buffer memory for retrieval by the application, depending on the forwarding information of the identifier pair in the current query, if the identifier for the incoming message is within the range delimited by the first identifier and the second identifier in the current query.

5. A method for filtering messages, which are received, via a serial data bus of a communication network, in a communication module of a user connected to the data bus, the method comprising:

using a filter system, the messages each having an identifier for identification, and the characteristics of the filter system being defined by message identifiers which are stored in at least one list of the filter system;

storing multiple identifier pairs in the at least one list of the filter system which define a range delimited in each case by a first identifier and a second identifier;

comparing the identifier for an incoming message to at least selected identifier pairs;

making a query concerning whether the identifier for the incoming message is greater than or equal to the first identifier of a selected identifier pair and less than or equal to the second identifier of the selected identifier pair;

wherein:

each identifier pair has an associated filter type information stored in the at least one list, each item of filter type information identifying whether an incoming message that is within the range delimited by the first identifier and the second identifier of a respectively associated identifier pair should be forwarded to the application or rejected;

forwarding the incoming message to the application in response to determining that (a) the identifier for the incoming message is within the range delimited by the first identifier and the second identifier of the selected identifier pair, and (b) the filter type information of the selected identifier pair identifies forwarding; and rejecting the incoming message to the application in response to determining that (a) the identifier for the incoming message is within the range delimited by the first identifier and the second identifier of the selected identifier pair, and (b) the filter type information of the selected identifier pair identifies rejecting, wherein the filter system has at least one further list containing message identifiers, the identifier for an incoming message being compared at least to selected identifiers from the at least one further list, and a query being made concerning whether the identifier for the incoming message is equal to a selected identifier from the at least one further list, and wherein in addition to the identifier for the incoming message being within the range delimited by the first identifier and the second identifier of a selected identifier pair, the forwarding or rejecting of the incoming message is also conditioned on the identifier for the incoming message being equal to the selected identifier from the at least one further list.

6. The method of claim 5, wherein the first identifiers and second identifiers of the identifier pairs stored in the at least one list are used as identifiers in the at least one further list, and wherein an incoming message is forwarded to the application or is rejected if the identifier for the incoming message is one of equal to the first identifier and equal to the second identifier of a selected identifier pair.

7. A method for filtering messages, which are received, via a serial data bus of a communication network, in a communication module of a user connected to the data bus, the method comprising:
  using a filter system, the messages each having an identifier for identification, and the characteristics of the filter system being defined by message identifiers which are stored in at least one list of the filter system;
  storing multiple identifier pairs in the at least one list of the filter system which define a range delimited in each case by a first identifier and a second identifier;
  comparing the identifier for an incoming message to at least selected identifier pairs;
  making a query concerning whether the identifier for the incoming message is greater than or equal to the first identifier of a selected identifier pair and less than or equal to the second identifier of the selected identifier pair;
  wherein:
    each identifier pair has an associated filter type information stored in the at least one list, each item of filter type information identifying whether an incoming message that is within the range delimited by the first identifier and the second identifier of a respectively associated identifier pair should be forwarded to the application or rejected;
  forwarding the incoming message to the application in response to determining that (a) the identifier for the incoming message is within the range delimited by the first identifier and the second identifier of the selected identifier pair, and (b) the filter type information of the selected identifier pair identifies forwarding; and
  rejecting the incoming message to the application in response to determining that (a) the identifier for the incoming message is within the range delimited by the first identifier and the second identifier of the selected identifier pair, and (b) the filter type information of the selected identifier pair identifies rejecting,
  wherein the filter system has at least one further list containing at least one of acceptance identifiers and acceptance masks,
  wherein the identifier for an incoming message is compared at least to at least one of selected acceptance identifiers and to selected acceptance masks from the at least one further list,
  wherein a query is made concerning whether the identifier for the incoming message is equal to a selected acceptance identifier or is included by the acceptance mask, and
  wherein in addition to the identifier for the incoming message being within the range delimited by the first identifier and the second identifier of a selected identifier pair, the forwarding or rejecting of the incoming message is also conditioned on the identifier for the incoming message being one of equal to the selected acceptance identifier and included by the acceptance mask.

8. The method of claim 7, wherein the first identifiers and the second identifiers of the identifier pairs stored in the at least one list are used as at least one of acceptance identifiers and acceptance masks of the at least one further list, and wherein an incoming message is forwarded to the application or is rejected if the identifier for the incoming message is equal to the first identifier for a selected identifier pair or is included by the second identifier for the selected identifier pair.

9. A filter system for a communication module of a user which is connected to a serial data bus of a communication network, for filtering incoming messages received via the data bus, the messages each having an identifier for identification, comprising:
  a filtering arrangement, including:
    at least one list containing identifiers for messages via which the characteristics of the filter system are defined, wherein each identifier specifies a priority of a corresponding message, and wherein multiple identifier pairs are stored in the at least one list of the filter system which define a range delimited in each case by a first identifier and a second identifier; and
    a query arrangement to compare the identifier for an incoming message at least to selected identifier pairs to determine whether the identifier for the incoming message is greater than or equal to the first identifier of a selected identifier pair and is less than or equal to the second identifier of the selected identifier pair;
  wherein each identifier pair has an associated filter type information stored in the at least one list, each item of filter type information identifying whether an incoming message that is within the range delimited by the first identifier and the second identifier of a respectively associated identifier pair should be forwarded to the application or rejected;
  wherein the filter system arrangement causes incoming messages to be forwarded to the application in response to determining that (a) the identifier for the incoming message is within the range delimited by the first identifier and the second identifier of the selected identifier pair, and (b) the filter type information of the selected identifier pair identifies forwarding; and
  wherein the filter system arrangement causes incoming messages to be rejected in response to determining that (a) the identifier for the incoming message is within the range delimited by the first identifier and the second identifier of the selected identifier pair, and (b) the filter type information of the selected identifier pair identifies rejecting.

10. The filter system of claim 9, wherein the filter system has a memory element, which is one of a random access memory, a read-only memory, and a nonvolatile memory for storing the identifier pairs of the list.

11. The filter system of claim 10, wherein the memory element has a width of 32 bits.

12. The filter system of claim 9, wherein the filter system includes separate lists for standard 11-bit identifiers for CAN messages and for extended 29-bit identifiers for CAN messages.

13. The filter system of claim 9, wherein the filter system includes separate lists for CAN data frame messages and for CAN remote frame messages.

* * * * *